(12) United States Patent
Lee

(10) Patent No.: US 6,320,626 B1
(45) Date of Patent: Nov. 20, 2001

(54) APPARATUS AND METHOD FOR CONTROLLING BRIGHTNESS IN A MONITOR SCREEN

(75) Inventor: Ji-hyun Lee, Kwangmyung (KR)

(73) Assignee: Samsung Electronics, Co. Ltd. (KR)

(*) Notice: Subject to any disclaimer, the term of this patent is extended or adjusted under 35 U.S.C. 154(b) by 0 days.

(21) Appl. No.: 09/174,394

(22) Filed: Oct. 14, 1998

(30) Foreign Application Priority Data

Dec. 2, 1997 (KR) .................................................. 97-65246

(51) Int. Cl.⁷ .................................................. H04N 5/57
(52) U.S. Cl. .................................................. 348/687; 348/689
(58) Field of Search .................................................. 348/687, 689, 348/379, 704, 806; 315/368.18, 368.21, 368.23; H04N 5/57, 5/68

(56) References Cited

U.S. PATENT DOCUMENTS 6,072,540 * 6/2000 Park .................................................. 348/687
6,160,592 * 12/2000 Yoon .................................................. 348/687

* cited by examiner

*Primary Examiner*—Sherrie Hsia
(74) *Attorney, Agent, or Firm*—Mills & Onello, LLP

(57) ABSTRACT

There is provided a device for controlling the brightness of a monitor screen to prevent the edge of the screen from appearing darker than the center of the screen by setting a black level signal scanned to the edge of the screen to be greater than a black level signal scanned to the center of the screen. The device includes a parabolic signal generator for generating a parabolic signal. A video output signal generator receives a video input signal in which an image is carried on a black level signal voltage and a brightness control voltage for controlling the brightness of the screen. The video output signal generator generates a first video output signal having a black level signal adjusted by the brightness control voltage. A signal synthesizer receives the first video output signal and the parabolic signal and generates therefrom a second video output signal in which the parabolic signal is added to the first video output signal.

4 Claims, 3 Drawing Sheets

APPARATUS AND METHOD FOR CONTROLLING BRIGHTNESS IN A MONITOR SCREEN

BACKGROUND OF THE INVENTION

1. Field of the Invention

The present invention relates to a monitor, and more particularly, to a screen brightness controller for a monitor which compensates for variations in brightness with curvature of the screen.

2. Description of the Related Art

A video signal is typically carried on a black level signal that is a predetermined direct current (DC) voltage indicating the brightness of a screen, or a luminance to be scanned to a screen such as by using an electron gun. The screen brightness can be controlled by a user operating a computer.

This conventional brightness control provides control for the entire screen. If the brightness is adjusted to a significantly bright state, a portion to be black on a screen appears gray, and a portion to be gray appears black. Also, if the brightness is adjusted to an excessively dark state, black appears gray and gray appears black, causing an abnormal display of the screen.

FIG. 1 is a block diagram of a conventional screen brightness controller in a monitor. Referring to FIG. 1, the brightness controller 1 includes an amplifier 2, a comparator 3, a clamp capacitor 4 and a switch 5. The amplifier 2 has a non-inverting input port for receiving a video input signal Vin having a video signal carried on a black level signal and an inverting input port to which the clamp capacitor 4 is connected. The amplifier 2 provides as an output a video output signal Vout which is amplified by a difference in voltage between the two input ports.

The comparator 3 receives the video output signal Vout and a brightness control voltage B for controlling the brightness of a monitor screen. The comparator 3 compares the black level voltage of the video output signal Vout with the brightness control voltage B.

The switch 5 is connected between the output port of the comparator 3 and the inverting input port of the amplifier 2. While the video output signal Vout is flied back, the switch 5 is switched on (closed) and the clamp capacitor 4 is charged or discharged, thus changing the voltage at the inverting input port of the amplifier 2.

The configuration of FIG. 1 is used on the brightness controller 1 because an image is carried on the black level signal when the video output signal Vout is horizontally scanned, but the video output signal Vout has only the black level signal during fly-back.

The operation of the monitor screen brightness controller 1 of FIG. 1 will now be described. When the switch 5 is switched on (closed), the comparator 3 compares the black level signal of the video output signal Vout with the brightness control voltage B. If the black level signal is greater than the control voltage B, the charges stored in the clamp capacitor 4 are discharged to the amplifier 2 by a current output from the comparator 3. Thus, the voltage of the clamp capacitor 4 decreases, and that of the non-inverting input port of the amplifier 2 increases, and, consequently, the black level signal of the video output signal Vout is lowered. The video output signal Vout is again input to the comparator 3, and the aforementioned operations are repeated until the black level signal of the video output signal Vout is equal to the brightness control voltage B.

On the other hand, if the black level signal of the video output signal Vout is smaller than the brightness control voltage B, the clamp capacitor 4 is charged by the current output from the comparator 3. Therefore, the voltage of the clamp capacitor 4 increases, and the voltage of the other input port of the amplifier 2 decreases. As a result, the black level signal of the video output signal Vout is increased. The video output signal Vout is again input to the comparator 3, and the aforementioned operations are repeated until the black level signal of the video output signal Vout becomes the same as the brightness control voltage B. A user can change the brightness of a screen to a desired level by controlling the brightness control voltage B.

FIG. 2 is a schematic view of a conventional cathode ray picture tube. Referring to FIG. 2, an electron gun 21 scans an electron beam over a screen 22 to display an image on the screen 22. The image on the screen 22 is controlled by, among other factors, the intensity of the electron beam as it strikes the screen 22 at each position. The intensity of the beam is controlled by a video output signal Vout, received by the electron gun.

The surface of the screen 22 is typically relatively flat compared to the radius centered at the output of the gun 21 (shown in dashed lines), such that distances between the electron gun 21 and the screen 22 vary over the scanning period. That is, a distance d between the center of the screen 22 and the electron gun 21 is less than a distance d+$\Delta$d between the edge of the screen 22 and the electron gun 21. This variation in distance causes a variation in path length of the beam with respect to positions on the screen. This can result in reduced image intensity at the edges of the screen.

FIG. 3 is a schematic plot illustrating an exemplary video output signal Vout shown in FIG. 2 with respect to time. Referring to FIG. 3, the video output signal Vout includes a black level signal having a constant amplitude.

When the video output signal Vout is horizontally scanned to a screen via the electron gun, the black level signal scanned to the edges of the screen appears smaller than that scanned to the center of the screen, since the scan distance, i.e., the distance between the screen and the electron gun, is not constant. As a result, the edges of the screen 22 can appear darker than the center of the screen.

SUMMARY OF THE INVENTION

An object of the present invention is to provide a device for controlling the brightness of a monitor screen to prevent the edges of a screen from appearing darker than the center of the screen.

In accordance with the invention, there is provided a device for controlling the brightness of a monitor screen. The device includes a parabolic signal generator for generating a parabolic signal. A video output signal generator receives a video input signal in which an image is carried on a black level signal and a brightness control voltage for controlling the brightness of a screen. The signal generator outputs a first video output signal having a black level signal adjusted by the brightness control voltage. A signal synthesizer receives the first video output signal and the parabolic signal and outputs a second video output signal in which the parabolic signal is combined with the first video output signal.

In one embodiment, the parabolic signal generator includes a sawtooth wave generator for generating a sawtooth wave and a first inverter connected to the output port of the sawtooth wave generator for inverting the sawtooth wave and outputting the inverted sawtooth wave. A multiplier receives the sawtooth wave and the inverted sawtooth wave, multiplies the two received sawtooth waves, and outputs an upward-peaking parabolic signal. A second inverter connected to the output port of the multiplier inverts the upward-peaking parabolic signal and outputs a downward-peaking parabolic signal.

In one embodiment, the sawtooth wave generator receives a control signal for controlling a parabola gain and a control signal for controlling the synchronization of the sawtooth wave.

In the device for controlling the brightness of a monitor screen according to the present invention, the black level signal scanned to the edges of a screen is set greater than that scanned to the center thereof. Therefore, brightress is substantially uniform over the entire screen.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
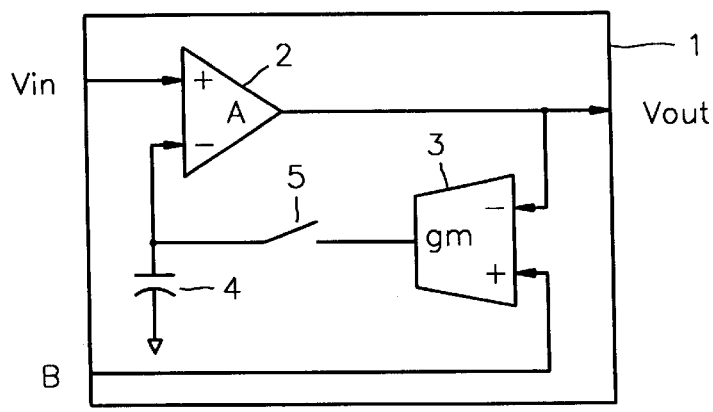
FIG. 1 is a block diagram of a conventional device for controlling the brightness of a monitor screen.
Figure 2:
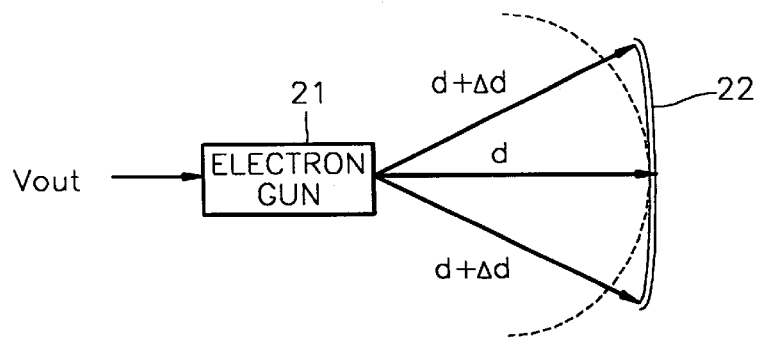
FIG. 2 is a schematic view of a conventional cathode ray picture tube.
Figure 3:
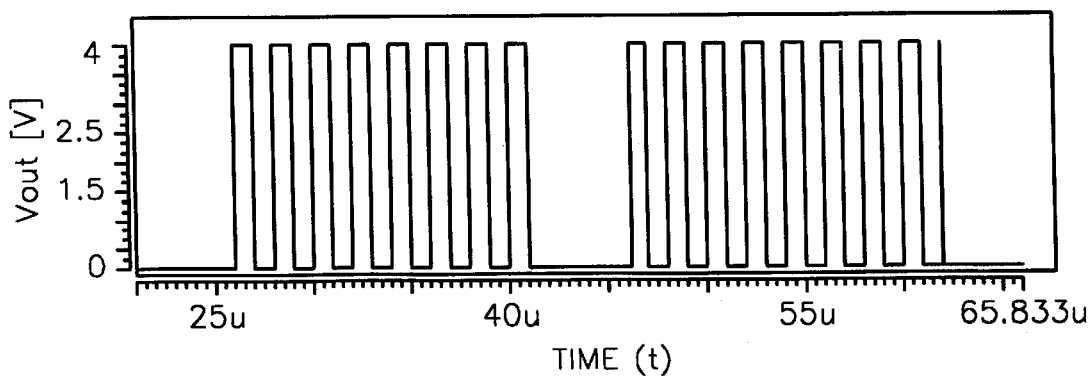
FIG. 3 is a schematic plot illustrating an exemplary video output signal shown in FIG. 2.
Figure 4:
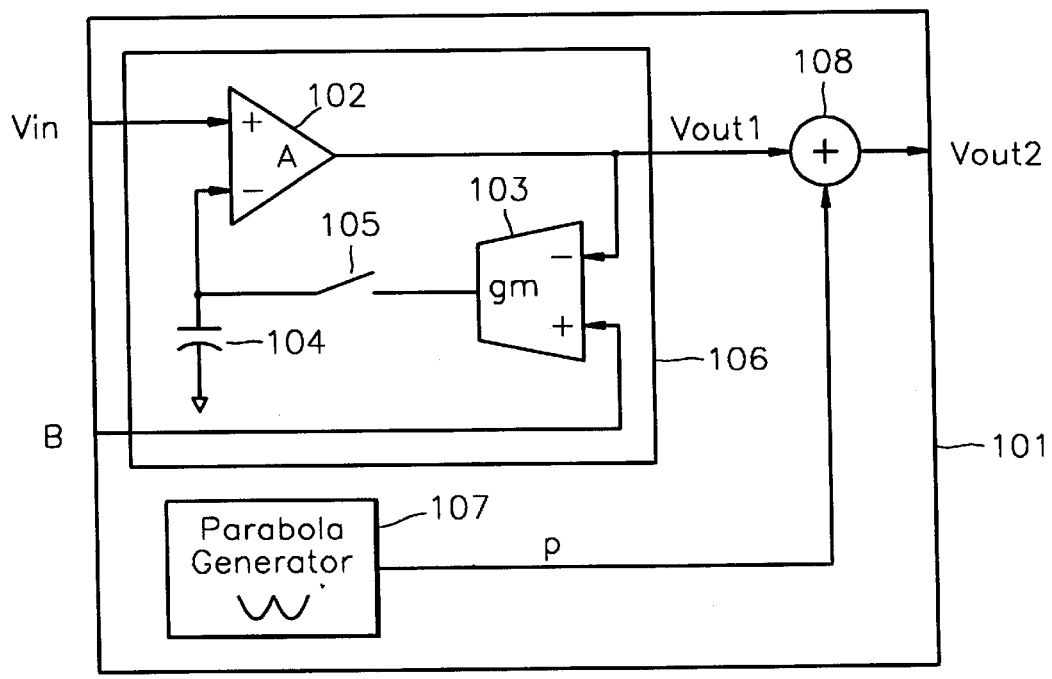
FIG. 4 is a block diagram of a device for controlling the brightness of a monitor screen according to the present invention.

Referring to FIG. 4, one embodiment of a brightness controller 101 according to the invention includes a video output signal generator 106 which generates a first video output signal Vout1. A parabolic signal generator 107 generates a parabolic signal P, and a signal synthesizer 108 for generates a second video output signal Vout2 by adding the first video output signal Vout1 to the parabolic signal P. The video output signal generator 106 receives a video input signal Vin in which an image is carried on a black level signal voltage and outputs the first video output signal Voutl having a black level signal controlled by a brightness control signal B.

The video output signal generator 106 includes an amplifier 102, a comparator 103, a clamp capacitor 104 and a switch 105. The amplifier 102 has one non-inverting input port which receives the video input signal Vin having an image carried on the black level signal. The amplifier 102 also includes an inverting input port to which the clamp capacitor 104 is connected. The amplifier 102 outputs the first video output signal Voutl amplified by a difference in voltage between the two input ports.

The comparator 103 receives the first video output signal Vout1 and the brightness control voltage B for controlling the brightness of a monitor screen. The comparator 103 compares the signals and outputs a current corresponding to the difference between them. The switch 105 is connected between the output port of the comparator 103 and the inverting input port of the amplifier 102. The switch 105 is switched on only when the second video output signal Vout2 is flied back, and, at this time, the clamp capacitor 104 is charged or discharged, thus changing the voltage at the inverting input port of the amplifier 2.

The parabolic signal generator 107 generates, in one embodiment, an upward-shaped parabolic signal P. The parabolic signal P, when combined with the signal Vout1 in sythesizer 108, adjusts the black level signal such that the second video output signal Vout2 is compensated for the variation in signal intensity with scan position when the second video output signal Vout2 is scanned to the screen.

The operation of the screen brightness controller 101 according to the invention will now be described. When the switch 105 is switched on (closed), the comparator 103 compares the black level signal of the first video output signal Vout1 with the brightness control voltage B. When Vout1 is greater than B, the charges stored in the clamp capacitor 104 are discharged to the amplifier 102 by the current output by the comparator 103. Thus, the voltage of the clamp capacitor 104 is lowered, and that of the inverting input port of the amplifier is raised. As a result, the voltage of the first video output signal Vout1 decreases. The first video output signal Vout1 is fed back to the comparator 103, and the above-described process repeats until the voltage of the first video output signal Vout1 is equal to the brightness control voltage B.

Alternatively, when the black level signal of the first video output signal Vout1 is smaller than the brightness control voltage B, the clamp capacitor 104 is charged by the current output by the comparator 103. Thus, the voltage of the clamp capacitor 104 is raised, and that of the inverting input port of the amplifier is lowered. As a result, the voltage of the first video output signal Vout1 is increased. The first video output signal Vout1 is fed back to the comparator 103, and the process repeats until the voltage of the first video output signal Vout1 is equal to the brightness control voltage B.

Accordingly, the video output signal generator 106 outputs the first video output signal Vout1 whose black level signal is adjusted by the brightness control voltage B. The signal synthesizer 108 outputs the second video output signal Vout2 obtained by adding the first video output signal Vout1 to the parabolic signal P. The black level signal of the second video output signal Vout2 is greater when it is scanned to the edges of the screen than when it is scanned to the center. As a result, a difference in brightness between the center and edge of the screen due to a difference in path length between the center of the screen and the edge of the screen can be compensated.

Figure 5:
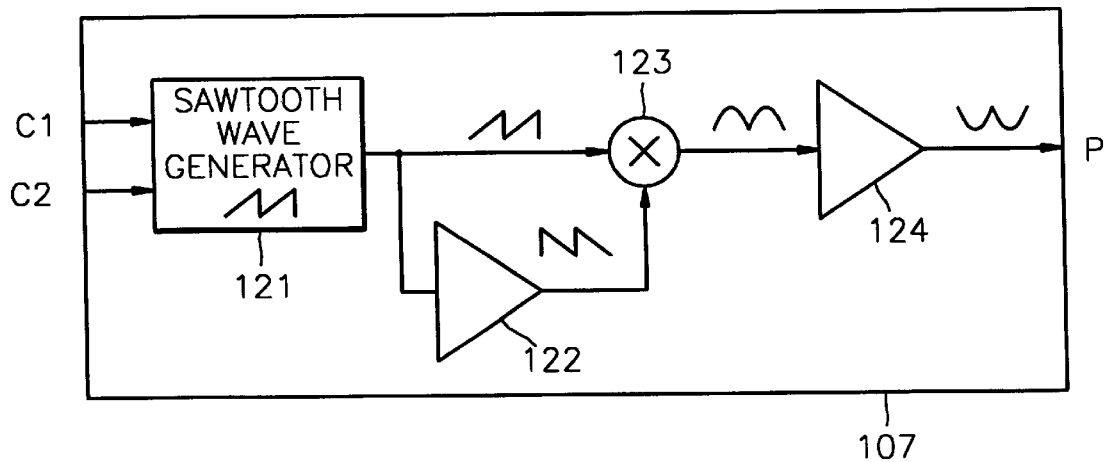
FIG. 5 is a schematic view of a parabolic signal generator according to the invention.

FIG. 5 is a detailed functional block diagram of one embodiment of the parabolic signal generator according to the invention. Referring to FIG. 5, the parabolic signal generator 107 includes a sawtooth wave generator 121, first and second inverters 122 and 124 and a multiplier 123. The sawtooth wave generator 121 receives first and second control signals C1 and C2 and generates a sawtooth wave therefrom.

The first and second control signals C1 and C2 are controlled according to the size and curvature of the monitor screen being used. The first control signal C1 controls a parabolic gain, i.e., the degree of curvature of the parabolic signal P. C1 therefore controls the degree of compensation of the black level signal when the second video output signal Vout2 of FIG. 4 is scanned to the screen. The second control signal C2 controls the synchronization of the sawtooth wave.

The first inverter 122 inverts the sawtooth wave output from the sawtooth wave generator 121 and outputs the inverted sawtooth wave. The multiplier 123 receives the sawtooth wave output from the sawtooth wave generator 121 and the inverted sawtooth wave output from the first inverter 122, multiplies them, and outputs an upward-peaking parabolic signal, as shown schematically. The second inverter 124 is connected to the output port of the multiplier 123 and inverts the upward-peaking parabolic signal to generate and output a downward-peaking parabolic signal P.

Figure 6:
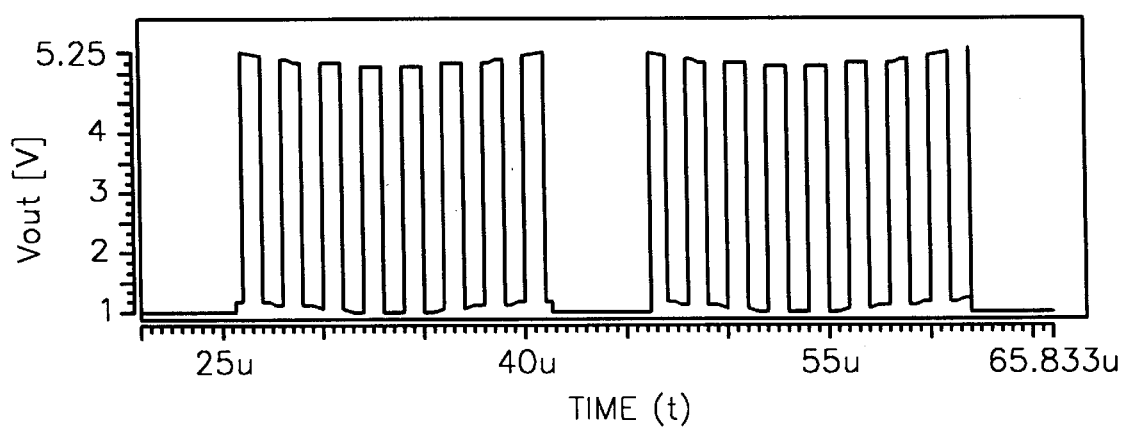
FIG. 6 is a schematic plot illustrating a video output signal generated in accordance with the invention.

FIG. 6 contains a schematic plot illustrating an exemplary second video output signal Vout2 generated in accordance with the invention. Referring to FIG. 6, the black level signal of the second video output signal Vout2 is altered for the horizontal scan. That is, the black level signal of the second video output signal Vout2 scanned to the edge of the screen is greater than that of the second video output signal Vout2 scanned to the center of the screen. As a result, the black level signal of the second video output signal Vout2 scanned to the edge of the screen appears the same as that of the second video output signal Vout2 scanned to the center of the screen. As a result, the brightness of the entire screen becomes uniform across the screen.

While this invention has been particularly shown and described with references to preferred embodiments thereof, it will be understood by those skilled in the art that various changes in form and details may be made therein without departing from the spirit and scope of the invention as defined in the following claims.

What is claimed is:

1. A device for controlling brightness of a monitor screen, comprising:

a parabolic signal generator for generating a parabolic signal;

a video output signal generator for receiving a video input signal in which an image is carried on a black level signal, and a brightness control voltage for controlling the brightness of a screen, and outputting a first video output signal having a black level signal adjusted by the brightness control voltage; and a signal synthesizer for receiving the first video output signal and the parabolic signal and outputting a second video output signal in which the parabolic signal is combined with the first video output signal.

2. The device for controlling brightness of a monitor screen as claimed in claim 1, wherein the parabolic signal generator comprises:

a sawtooth wave generator for generating a sawtooth wave;

a first inverter connected to the output port of the sawtooth wave generator for inverting the sawtooth wave and outputting an inverted sawtooth wave;

a multiplier for receiving the sawtooth wave and the inverted sawtooth wave, multiplying the two received sawtooth waves, and outputting a upward-peaking parabolic signal; and a second inverter connected to the output port of the multiplier for inverting the upward-peaking parabolic signal and outputting a downward-peaking parabolic signal.

3. The device for controlling brightness of a monitor screen as claimed in claim 2, wherein the sawtooth wave generator receives a control signal for controlling a parabola gain.

4. The device for controlling brightness of a monitor screen as claimed in claim 2, wherein the sawtooth wave generator receives a control signal for controlling the synchronization of the sawtooth wave.

* * * * *